United States Patent [19]

Taylor et al.

[11] 4,230,676
[45] Oct. 28, 1980

[54] COMPOSTING APPARATUS

[75] Inventors: Lauren P. Taylor, Swarthmore; Alex Petroski, Springfield, both of Pa.

[73] Assignee: LRS Research, Broomall, Pa.

[21] Appl. No.: 38,700

[22] Filed: May 14, 1979

[51] Int. Cl.² ........................................ C05F 11/08
[52] U.S. Cl. ...................................... 422/62; 71/9;
422/110; 422/111; 422/184; 435/289; 435/313;
248/49; 248/422
[58] Field of Search ................. 422/62, 110, 111, 184,
422/187, 238; 71/8, 9; 435/313, 289, 290, 291,
302; 248/49, 422, 669, 656; 52/126, 745

[56] References Cited

U.S. PATENT DOCUMENTS

| 981,113 | 1/1911 | Richards | 248/422 X |
|---|---|---|---|
| 1,470,529 | 10/1923 | Gerber | 248/49 |
| 2,474,833 | 7/1949 | Eweson | 71/9 |
| 3,169,741 | 2/1965 | Bittner | 248/49 |
| 3,314,765 | 4/1967 | Abson et al. | 71/9 |
| 3,568,455 | 3/1971 | McLaughlin et al. | 248/49 X |
| 3,689,403 | 9/1972 | Long | 422/111 X |
| 3,926,737 | 12/1975 | Wilson et al. | 435/290 X |
| 4,050,917 | 9/1977 | Varro | 71/9 |
| 4,062,770 | 12/1977 | Kneer | 71/9 X |
| 4,099,617 | 7/1978 | Niso | 248/49 X |
| 4,126,012 | 11/1978 | Waller | 248/49 X |
| 4,135,907 | 1/1979 | Houser et al. | 71/9 |

FOREIGN PATENT DOCUMENTS

| 692090 | 8/1964 | Canada | 71/9 |
|---|---|---|---|
| 2009764 | 9/1971 | Fed. Rep. of Germany | 71/9 |
| 2323565 | 12/1973 | Fed. Rep. of Germany | 71/9 |
| 2508321 | 7/1976 | Fed. Rep. of Germany | 71/9 |
| 25036 | of 1903 | United Kingdom | 248/49 |

OTHER PUBLICATIONS

Product Engineering, 10/1961, p. 105, Duff–Norton Worm Gear Jacks.
Product Engineering, 1/1961, p. 73, Duff Norton Worm Gear Jacks.

Primary Examiner—Kenneth M. Schor
Attorney, Agent, or Firm—Philip S. Johnson

[57] ABSTRACT

An apparatus and a method for composting organic material, wherein a plurality of frame members are spaced from each other, and a plurality of support members are connected to each frame members. Hollow, perforated conduits are connected to and extend between corresponding support members of adjacent frame members. The conduits are movable vertically along the support members. An evacuator withdraws fluid from the compost material through the conduits, and an injector may inject treatment material into the compost material through the conduits. An analysis system is provided to analyze the composting state of the organic material and to determine any treatment necessary required by the organic material as a result of the analysis of the composting state.

24 Claims, 5 Drawing Figures

COMPOSTING APPARATUS

BACKGROUND OF THE INVENTION

The present invention relates to forced draft compostors, and in particular, relates to composting apparatuses wherein long windrows of organic material are formed over one or more conduits which evacuate air from the windrow to speed the composting process.

With the increased interest in "natural" foods and a growing general aversion to many foods treated with chemical pesticides and herbicides, there is also an increasing demand for "organic" fertilizers in place of the commonly used chemical fertilizers. Aside from using animal excrement and other organic waste by-products, one of the oldest methods of obtaining natural, organic fertilizer is the composting method wherein leaves and other vegetation are collected into piles in which the process of natural decay breaks down these various materials into material suitable for use as fertilizer. Composting, however, is not a quick process when simply left to procede at its natural rate in a pile of organic material, and the process rate is subject to many variables which affect the rate, such as: temperature, humidity, pH, and availability of air or oxygen to enhance the decay process.

SUMMARY OF THE INVENTION

Because of the new, increased, and everincreasing, demand for compost fertilizing material it is necessary to speed up the composting process and improve the quality of the compost produced. It is, therefore, a primary object of the present invention to provide an apparatus which can be used to improve composting of natural materials.

It is a further object to provide an apparatus which can pull air from the atmosphere deep within the compost pile to speed the decay taking place thereinside.

Also, it is an object of the invention to provide a plurality of conduits which may be variably positioned inside the compost pile to drain off liquids therein as well as act as passageways for introducing air, seed micro-organisms, water and other material as may be necessary to enhance the composting process into the compost pile.

The invention is intended to provide an apparatus which will support the conduits and which can easily and readily adjust the vertical positions of the conduits.

Furthermore, it is a object of the invention to provide a system for controlling the apparatus by monitoring and guiding the decaying process within the compost pile.

Finally, it is an object of the present invention to provide an improved composting method which will enhance the natural composting process.

These various objects are achieved in the present invention by an apparatus with a plurality of hollow, perforated conduits which are adapted to be positioned within a compost windrow. The conduits are affixed to spaced vertical supports and are movable vertically on these supports. An injector is provided at one end of the conduits, and an evacuator is connected to the other end. These two mechanisms make it possible to inject and withdraw material into and from the conduits which will enhance the composting of the material in the compost windrow. A control system is also provided to monitor and regulate the decaying process within the compost windrow and to operate additional systems which provide the conduits, and ultimately the windrow, with the additional materials through the injector which enhance the composting process and the product quality.

BRIEF DESCRIPTION OF THE DRAWINGS

The above discussed and further objects of the present invention along with a more complete understanding thereof will be more readily apparent from the following detailed description taken in conjunction with the formal drawings, wherein.

DETAILED DESCRIPTION OF THE INVENTION

Figure 1:
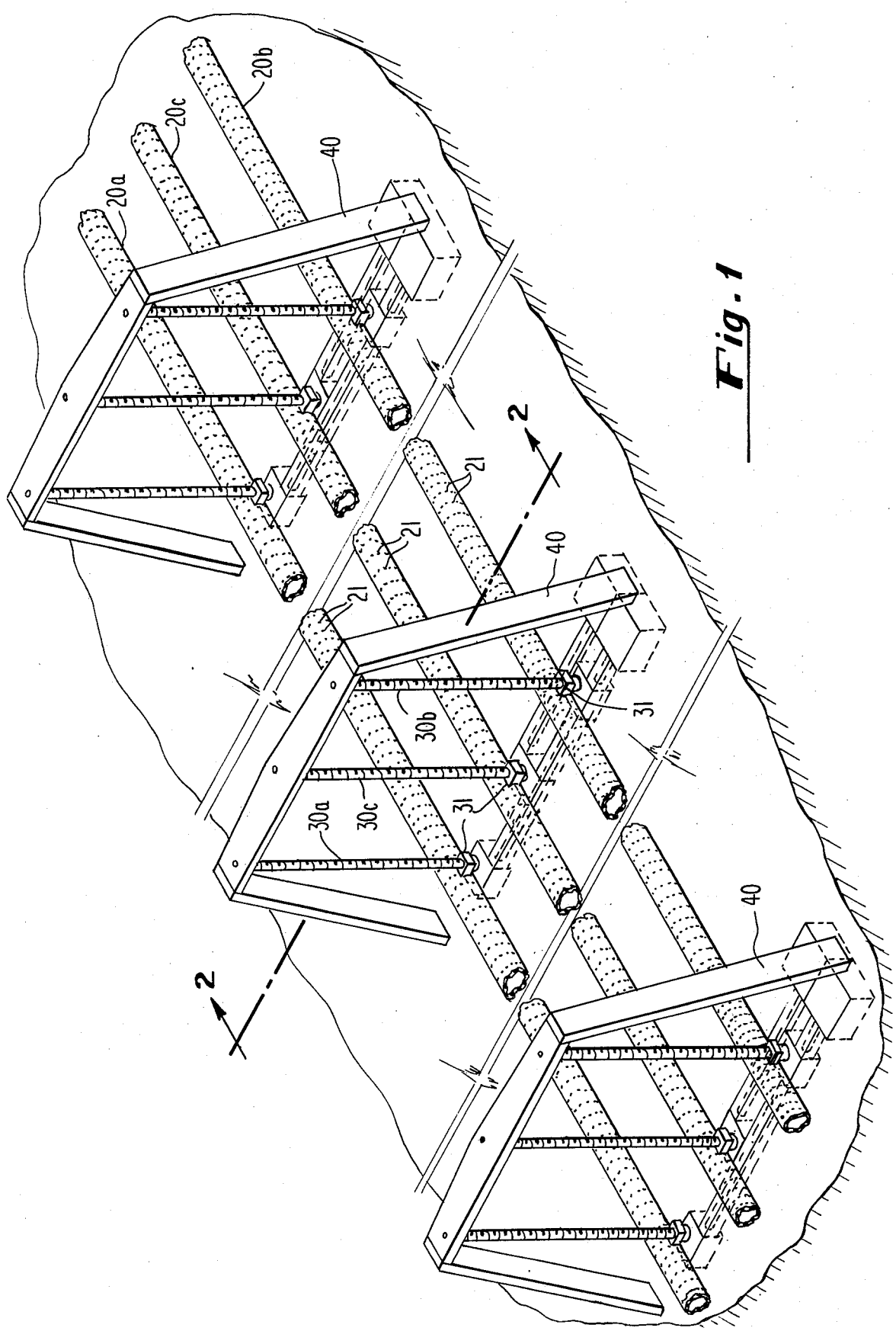
FIG. 1 is a view of the composting apparatus of the present invention.

Although specific forms of the invention have been selected for illustration in the drawings, and the following description is drawn in specific terms for the purpose of describing these forms of the invention, this description is not intended to limit the scope of the invention which is defined in the appended claims.

The present invention is particularly adapted to be useful in compost formation where the organic compost material 10 is piled in windrows during the treatment thereof. As shown in FIG. 1, the preferred embodiment of the present invention includes a plurality of, and preferably at least three, conduits 20a, 20b, 20c which are positioned parallel to each other in the lengthwise direction of the windrow of compost. Each of the conduits is supported at one or more points along its length by vertical supports 30a, 30b, 30c, and holding the vertical supports in position are patallel support frames 40. As will be more fully explained hereinafter, the compost material 10 is piled around the conduits and vertical supports within the support frame.

The conduits are made of any material, such as polyvinyl chloride, which possesses suitable chemical properties, strength, rigidity, and has, preferably, a relatively high heat transfer coefficient. Each conduit has a plurality of small holes 21 therethrough, and periodically spaced along the length thereof are electrical temperature sensors 25 and pH sensors 26 which check the temperature and pH of the material while it is being composted.

Figure 2:
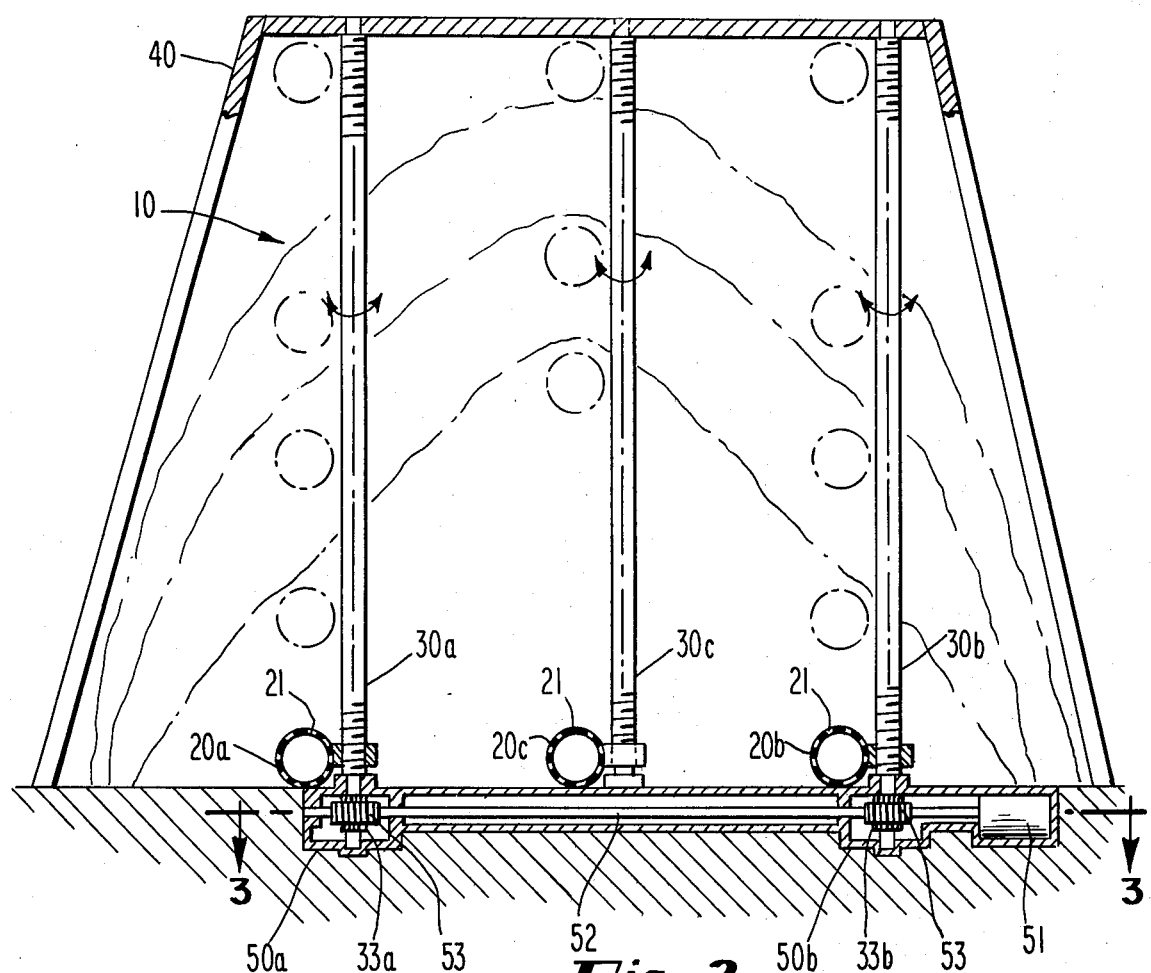
FIG. 2 is a side section view of a support structure and turning mechanism taken along the line 2—2 of FIG. 1.
Figure 3:
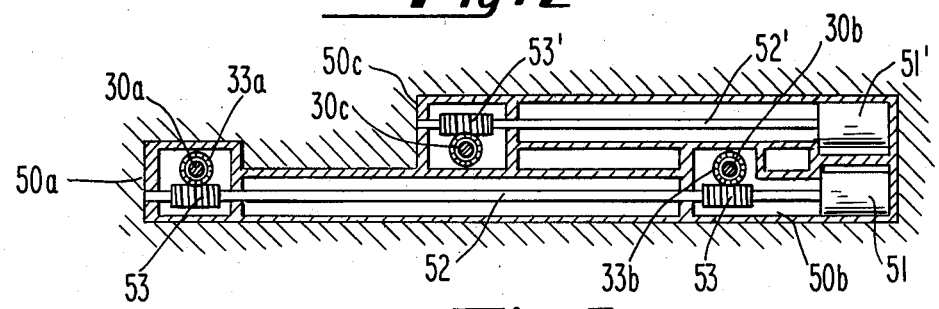
FIG. 3 is a section view of the turning mechanism of FIG. 2 taken along the line 3—3.

The vertical support members 30a–30c not only support the conduit members 20a–20c along their length; they are also provided to adjust the vertical positioning of the conduits. FIGS. 2 and 3 show one embodiment of the vertical support members. Each support member is a threaded rod which is connected at the top thereof to a support frame 40, while the bottom of each support member is connected to a turning mechanism generally numbered 50a–50c which rotates each support member. The conduits are affixed to internally threaded nut-like members 31 threaded onto the support members. Because the nut-like members 31 are threaded onto the vertical support members, when the support members rotate, the nut-like members and the conduits connected to the nut-like members raise or lower vertically, depending on the direction of the rotation of the support members.

The turning mechanisms 50a-50c which rotate the support members are generally a drive motor 51 and a drive shaft 52 driven by the motor 51. Attached to the drive shaft 52 is at least one threaded member 53 which engages a knurled member 33a-33c at the base of each support member. In this arrangement, therefore, the rotation of the horizontal drive shaft rotates the vertical support members when the threaded members 53 cause the knurled members 33a-33c to rotate. FIGS. 2 and 3 show an embodiment wherein two drive motors 51, 51' and two drive shafts 52, 52' rotate three support members 30a, 30b and 30c. Support members 30a and 30b are rotated by drive motor 51 and shaft 52; motor 51' and shaft 52' rotate support member 30c. This separation of the drive mechanisms allows the support members to be rotated independently of each other and, thereby, permits the conduits connected to the support members to be raised and lowered to different heights. In this instance in particular, the conduit 20c can be elevated differently than the two conduits 20a and 20b which are moved by motor 51.

Figure 4:
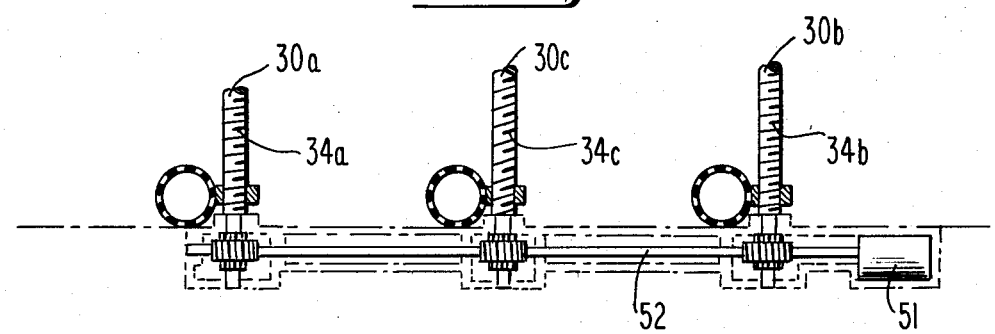
FIG. 4 is a alternate embodiment of a turning mechanism.

FIG. 4 shows another embodiment of a drive mechanism wherein, only one drive motor 50 is provided along with a single drive shaft 51 for rotating the three support members 30a, 30b and 30c. However, it is still possible to vary the heights of the conduits connected to the three support members while only using one motor and shaft. This effect is achieved by changing the threading 34a, 34b, 34c on the support members to permit more or less vertical movement of the nut-like member 31 and the respective conduit as a result of the rotation of the support member. In FIG. 4, the middle support member 30c is threaded to have larger turnings or windings than either of the side support members 30a, 30b. Therefore, even though the drive shaft rotates at a constant rate, the nut-like member 31 on support member 30c and conduit 20 will raise and lower at a different rate than the other two support members.

Though not shown, it should be understood that each of the support members may also be controlled independently by providing a separate drive motor and shaft for each member and that the motion of each support member operated by a single drive shaft can be altered by simply varying the dimensions of the threadings of each particular support member. Also, it is noted that any number of support members may be provided; the invention is not solely limited to three.

Figure 5:
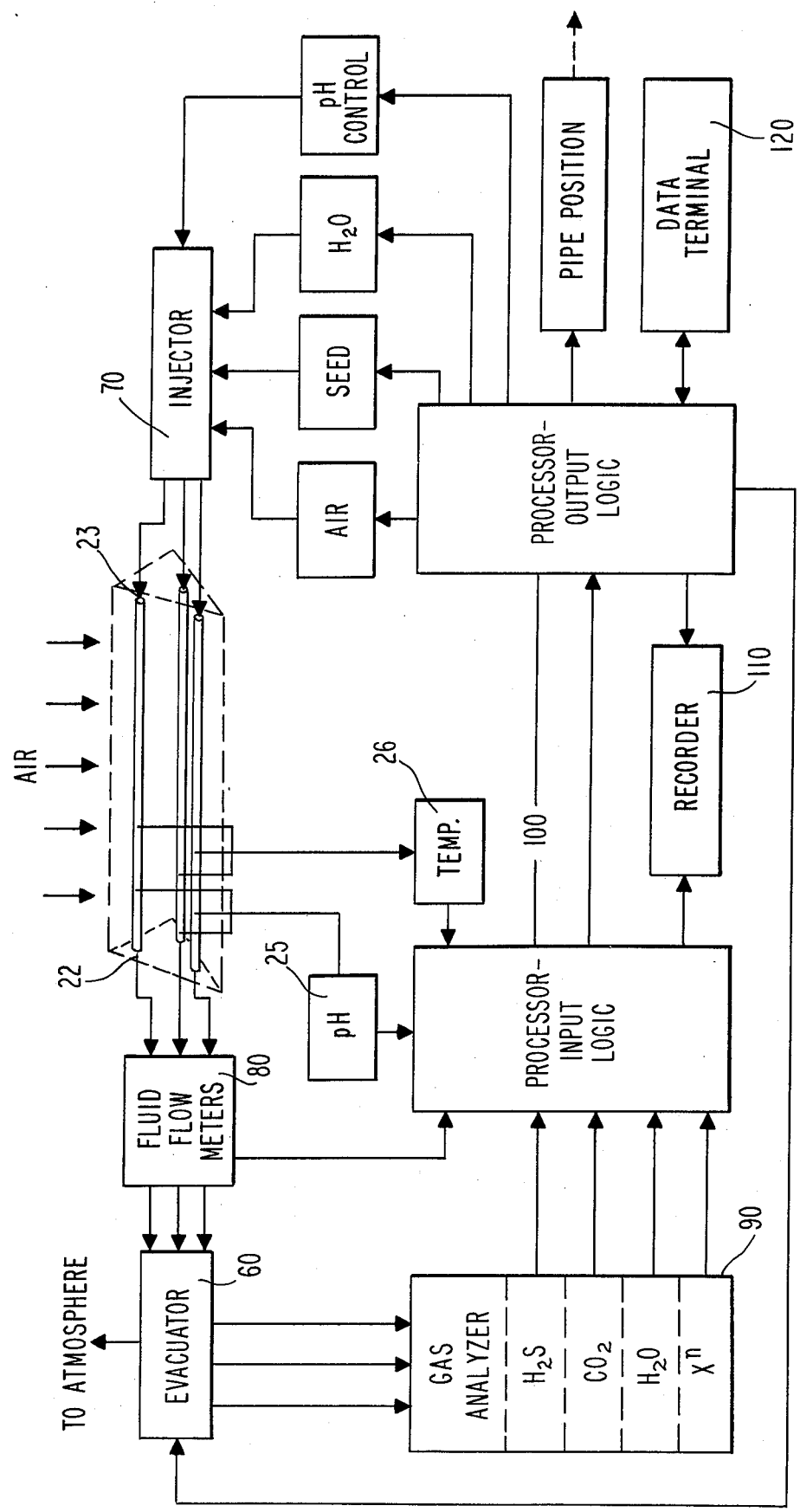
FIG. 5 is a schematic representation of the control system of the present invention.

A system for controlling the operation of this conduit apparatus and for enhancing and regulating the composting process is revealed in FIG. 5. As this schematic representation discloses, at the outlet ends of the conduits 20a-20c, an evacuation device 60, such as a vacuum evacuator, is connected for withdrawing fluids from the perforated hollow conduits which form during the composting and decay process and other material which enters into the conduits through the perforations. In order to analyze the fluids removed from the cylinder, flow meters 80 are incorporated at each outlet to measure the volumes of fluid coming from the conduits. Gaseous fluids which are withdrawn by the evacuation device are directed through a gas analyzer 90 (such as a gas chromatagraph or any other quantitative and qualitative gas measuring means) which is capable of detecting gasses such as hydrogen sulfide ($H_2S$), carbon dioxide ($CO_2$), and water vapor in the gas as well as any other gases or inert substances that might be contained in the gases and which may be determined to be beneficial in understanding how the composting process is proceeding. If it is not necessary to analyze the fluids withdrawn from the conduits in the compost pile, the evacuator can be vented directly into the atmosphere. Such an option makes it possible to prevent an unnecessary building up of fluids within the conduits, and will still allow air from the atmosphere to be drawn into the compost pile and drawn out through the conduits.

Connected to the input end 23 of the conduits is an injecting device or blower-injector 70 which is designed to inject a variety of treatment fluids or materials into the conduits as needed to enhance the compost production. For example, a plurality of different sources might provide the injector with additional air 71, water or water vapor 72, seed micro-organisms 73 such as certain bacteria which are beneficial to the composting decay process, and pH control substances 74 such as lime slurry which will be used to maintain the pH within the proper range for thorough and efficient composting. Any other material as required by the specific composting process may also be supplied to the injector 70 for transmission into the conduits.

An integral feature of the present invention is the incorporation of a micro-processor or computer-like device 100 into the control system. This device 100 has logic circuitry and is able to analyze and compare the information fed into it from the various sensors (pH and temperature, for example) and from the other measuring and analyzing devises in order to control the composting state within the windrow to result in optimum compost product. After the data from the various sources is fed into the processor, it is compared with predetermined optimum conditions previously programmed into the processor for the type of composting being conducted. The comparative data is then used to control the various treatment sources which supply the injector so that any necessary additions or corrections can be made in the material injected into the composting material through the compost conduits.

The various readings feed into the micro-processor 100 as well as the computations and comparisons based on this input material can be displayed or printed by a recorder 110, which will allow a record to be established of the composting state during the composting process along with a visual reading of the various conditions being sensed and the new requirements being directed to the treatment supply sources connected to the injector.

The comparative information which must be established in the logic circuitry of the processor is entered through a data terminal 120. This data terminal may also be used to override the automatic control of the system by the processor by permitting direct control of the various sources which feed into the injector.

It is also possible for the micro-processor to govern the positioning of the conduits within the compost windrow by connecting the various turning mechanisms 50 to the processor 100 as well. Again, however, manual control can be obtained through the input terminal 120.

Finally, the micro-processor can be used to operate the evacuating device 60 and control the amount of material withdrawn from the conduits as well as whether or not the withdrawn material must be continuously analyzed or whether the evacuated material can be released to the atmosphere. The processor might also determine how often the conduits need to be evacuated and air pulled through the windrow.

In the preferred embodiment, the turning mechanisms 50 are positioned in the ground beneath the location where the compost will be piled. When the apparatus is to be used, the windrow area is cleared, and the conduits are powered to the fully down position so that when the apparatus is to be used, the windrow area is cleared, and the conduits are powered to the fully down position. Three or more conduits lie on the ground and are ready to receive material to be composted on top thereof. Once a windrow has been formed of material 10 to be composted, the turning mechanisms are activated to selectively raise each of the conduits so that they will be spaced apart in a generally triangular configuration within the windrow as shown by the phantom lines in FIG. 2. This triangular configuration maximizes the air material contact during the composting operation. Once the composting operation has been completed, the conduits may be removed from the windrow either by disconnecting the conduits and pulling the conduits out of one end of the material, or, preferably, by powering the conduits on the support members to a full "up" position where they are disposed substantially above all of the composted material so that the compost may be scooped out from under the raised conduits and the area prepared for subsequent composting operations. The frame members are preferably large enough so that power front loading equipment can be used to remove the composted material.

It is known that active compost digestion takes place only within a preferred moisture content range and that the relative activity of the compost process may be determined by measureing the carbon dioxide production rate, hydrogen sulfide production rate, pH and temperature of the composting material. It is also known that certain aerobic bacteria live and multiply best at certain relatively higher temperatures, and that the success of the composting operation depends upon reaching and maintaining those temperatures for a length of time suitable to facilitate complete digestion of the compost material. Accordingly, these known optimum conditions can be programmed into the micro-processor, and in response to the data collected the various systems, treatment can be provided to insure that optimum conditions for composting are maintained in the windrow. For example, the micro-processor may be programmed to maximize carbon dioxide production while maintaining the pH, temperature, and moisture content of the compost bed within preselected optimum ranges.

Also, since one of the major problems in composting is the clogging of the small holes in the conduits, depending upon the gas flow rates attained and other information collected, the blower-injector may be used to blow air or other fluids through the conduits in order to clean out the orifices 21 and prevent them from clogging.

It will be understood that various changes in the details, materials and arrangements of parts which have been herein described and illustrated in order to explain the nature of this invention may be made by those skilled in the art within the principle and scope of the invention as expressed in the following claims.

It will further be understood that the "Abstract of the Disclosure" set forth above is intended to provide a nonlegal technical statement of the contents of the disclosure in compliance with the Rules of Practice of the United States Patent and Trademark Office, and is not intended to limit the scope of the invention described and claimed herein.

What is claimed:

1. A composting apparatus for use in composting organic material, said apparatus comprising:
    (a) a plurality of frame members spaced from each other;
    (b) a plurality of support members connected to each frame member;
    (c) a plurality of hollow, perforated conduits extending between said frame members and connected to support members at adjacent frame members, said conduits being movable vertically along said support members while connected to said support members;
    (d) injector means at one end of said conduits for injecting at least fluid into said conduits; and
    (e) evacuator means at the end of said conduits opposite said injector means for withdrawing at least fluid from said conduits.

2. An apparatus is claimed in claim 1, wherein:
    (a) said support members are threaded and are rotatable vertically in said frame members; and
    (b) nut-like members connected to said conduits threadably connect said conduits to said support members.

3. An apparatus as claimed in claim 2, further comprising at least one turning means at each frame member engaging said support members for rotating said support members, whereby rotating said support members causes said nut-like members and conduits to move vertically along said support members.

4. An apparatus as claimed in claim 3, wherein at least one of said support members connected to each frame member is threaded differently than the other support members connected that frame member.

5. An apparatus as claimed in claim 3, wherein:
    (a) two turning means are provided at each frame member, at least two support members being connected to one of said turning means and at least one support member being connected to the other turning means; and
    (b) each of said turning means rotates said support members connected thereto at different speeds, whereby rotating said support members at different speeds causes said nut-like members and conduits connected thereto to move at different speeds along said support members.

6. An apparatus claimed in claim 3, wherein each turning means is conprised of:
    (a) a motor; and
    (b) a drive shaft connected to said motor and extending horizontally therefrom, said drive shaft being operatively connected to said support members for rotating said support members.

7. A composting apparatus as claimed in claim 1, said apparatus further comprising:
    analysis means associated with said evacuator means for analyzing at least a portion of at least said fluid withdrawn from said material, whereby said analysis means indicates the compost state of said material.

8. An apparatus as claimed in claim 7, wherein said analysis means is comprised of means for qualitatively and quantitatively detecting $CO_2$.

9. An apparatus as claimed in claim 7, wherein said analysis means is comprised of means for qualitatively and quantitatively detecting $H_2S$.

10. An apparatus as claimed in claim 7, wherein said analysis means is comprised of means for qualitatively and quantitatively detecting $H_2O$.

11. An apparatus as claimed in claim 7, wherein said analysis means is comprised of means for qualitatively and quantitatively detecting organic substances withdrawn from said material.

12. An apparatus as claimed in claim 7, wherein said analysis means further comprises means for measuring the flow of said fluid withdrawn from said material.

13. An apparatus as claimed in claim 7, wherein said analysis means further comprises pH sensing means for sensing the pH of said material.

14. An apparatus as claimed in claim 7, wherein said analysis means further comprises temperature sensing means for sensing the temperature of said material.

15. An apparatus as claimed in claim 7, further comprising treatment means associated with said evacuator means for responding at least to said analysis means for selectively treating said organic material to alter the compost state thereof.

16. An apparatus as claimed in claim 15, wherein said treatment means comprises injector means for selectively injecting treating agents into said material.

17. An apparatus as claimed in claim 16, wherein said treatment means further comprises air supply means for supplying additional air to said material.

18. An apparatus as claimed in claim 16, wherein said treatment means further comprises seed micro-organism supply means for supplying seed micro-organisms to said material.

19. An apparatus as claimed in claim 16, wherein said treatment means further comprises water supply means for supplying water to said material.

20. An apparatus as claimed in claim 16, wherein said treatment means further comprises pH control supply means for supplying pH control material to said organic material.

21. An apparatus as claimed in claim 15, wherein said treatment means further comprises means for selectively positioning said evacuator means at least relative to portions of said material.

22. An apparatus as claimed in claim 7, further comprising recorder means associated with said analysis means for at least displaying the analysis of said compost state.

23. An apparatus as claimed in claim 15, further comprising recorder means associated with said treatment means for displaying said selective treating of said organic material.

24. An apparatus as claimed in claim 15, wherein said treatment means further comprises means for controlling the rate of fluid withdrawn by said evacuator means.

* * * * *